US006182231B1

(12) United States Patent
Gilgen

(10) Patent No.: US 6,182,231 B1
(45) Date of Patent: Jan. 30, 2001

(54) DYNAMIC PROGRAM SUSPENSION

(75) Inventor: David Blair Gilgen, Raleigh, NC (US)

(73) Assignee: International Business Machines Corporation, Armonk, NY (US)

( * ) Notice: Under 35 U.S.C. 154(b), the term of this patent shall be extended for 0 days.

(21) Appl. No.: 09/052,839

(22) Filed: Mar. 31, 1998

(51) Int. Cl.$^7$ ................................. G06F 1/26; G06F 3/00
(52) U.S. Cl. ................................. 713/324; 710/59
(58) Field of Search ..................... 713/300, 323, 713/324, 321; 710/59

(56) References Cited

U.S. PATENT DOCUMENTS

| | | | |
|---|---|---|---|
| 4,698,748 | * 10/1987 | Juzswik | 364/200 |
| 5,083,266 | * 1/1992 | Watanabe | 395/275 |
| 5,349,688 | * 9/1994 | Nguyen | 395/800 |
| 5,485,625 | * 1/1996 | Gumkowski | 395/800 |
| 5,594,863 | * 1/1997 | Stiles | 395/182.13 |
| 5,613,163 | * 3/1997 | Marron | 395/879 |
| 5,644,768 | * 7/1997 | Periwal | 395/672 |
| 5,867,060 | * 2/1999 | Burkett | 330/2 |
| 5,974,439 | * 10/1999 | Bollella | 709/104 |
| 5,987,339 | * 11/1999 | Asano | 455/574 |
| 5,987,611 | * 11/1999 | Freund | 713/201 |
| 6,016,548 | * 1/2000 | Nakamura | 713/323 |

OTHER PUBLICATIONS

Software Patent Institute Database of Software Technology, Record Display, Record 1, Serial No. TDB1293.0108, Dec. 30, 1997, 3 pgs.

Software Patent Institute Database of Software Technology, Record Display, Record 2, Serial No. TDB1293.0109, Dec. 30, 1997, 3 pgs.

Software Patent Institute Database of Software Technology, Record Display, Record 3, Serial NO. TDB1293.0110, Dec. 30, 1997, 3 pgs.

* cited by examiner

Primary Examiner—William Grant
Assistant Examiner—Ronald D Hartman, Jr.
(74) Attorney, Agent, or Firm—Myers Bigel Sibley & Sajovec, P.A.; Jeanine S. Ray-Yarletts

(57) ABSTRACT

Methods, systems and computer program products are provided which control execution of an application executing on a data processing system by receiving a first request for entry of sleep mode and determining a location in an application requesting entry of sleep mode. Execution of the application is suspended for a first predetermined time period based upon the application and location in the application requesting entry of sleep mode. A sleep history associated with the location in the application may also be generated based on previous durations of sleep associated with the location in the application and the first predetermined time adjusted based upon the sleep history associated with the location in the application so as to control the number of requests for entry of sleep mode associated with the location in the application.

45 Claims, 2 Drawing Sheets

DYNAMIC PROGRAM SUSPENSION

FIELD OF THE INVENTION

The present invention relates to the control of applications executing on data processing systems, and more particularly to the control of the suspension of execution of applications executing on data processing systems.

BACKGROUND OF THE INVENTION

One aspect of interaction between applications and operating systems which has the potential for inefficiency is in the execution of a "sleep" function. A sleep function is typically utilized by applications to suspend execution of the application while the application waits for an event to occur. For example, in communicating between applications an application may call the sleep function while it waits for a response from another application.

Conventional sleep functions, such as SLEEP in Microsoft's Windows® and DOSSLEEP in International Business Machines OS/2®, typically use a single duration for the time the application is suspended. This approach, however, can cause too much time to be spent sleeping if the duration is too large or too much time spent entering and exiting sleep mode if the duration is set too large. Furthermore, as applications may run on different platforms with different characteristics, it may be impossible to determine in advance a single sleep duration which provides the correct balance between too long a duration and too short a duration.

Even if a single platform could be anticipated, variations in session specific characteristics such as the number and nature of other applications executing on the system can also affect the needed sleep duration. Thus, if an application uses a single sleep duration for all situations, it is likely that this duration will not provide efficient use of system resources as either too many sleep calls will be made, thus utilizing processor resources for entering and leaving sleep mode, or too few sleep calls will be made, thus causing too long a suspension of the application to occur.

In light of these limitations of existing sleep mode functions, a need exists for improved methods of suspending execution of an application to wait for the occurrence of an event.

SUMMARY OF THE INVENTION

In view of the above discussion, it is an object of the present invention to provide an improved sleep mode which reduces the number of sleep calls performed, while also reducing the amount of time an application remains suspended.

A further object of the present invention is to provide a sleep mode which may replace sleep functions provided by existing operating systems.

Still another object of the present invention is to provide a sleep mode which may be utilized by applications with minimal or no modification to the applications.

Another object of the present invention is to provide a sleep mode which may be utilized by differing types of applications with differing sleep mode requirements without requiring modification to the sleep mode function.

These and other objects of the present invention are provided by methods, systems and computer program products which control execution of an application executing on a data processing system by receiving a first request for entry of sleep mode and determining a location in an application requesting entry of sleep mode. Execution of the application is suspended for a first predetermined time period based upon the application and location in the application requesting entry of sleep mode. A sleep history associated with the location in the application may also be generated based on previous durations of sleep associated with the location in the application and the first predetermined time adjusted based upon the sleep history associated with the location in the application so as to control the number of requests for entry of sleep mode associated with the location in the application.

By basing the duration of suspension of the application on the location in the application, a location specific sleep duration may be provided which controls the number of sleep calls required without increasing the duration of sleep. Furthermore, by basing this duration on a sleep history associated with the location, a dynamic sleep duration may be developed for each requesting location which may be fine tuned to that locations requirements. Thus, a location specific dynamic sleep duration may be obtained for different locations in an application requesting entry of sleep mode with minimal impact on the application.

In further embodiments of the present invention, a request for entry of sleep mode specifies the application and location in the application requesting entry of sleep mode. The location in the application requesting entry of sleep mode is then determined by inspecting the request for entry of sleep mode to determine the application and location in the application requesting entry of sleep mode. The request for entry of sleep mode may further specify a first predetermined time period which may be utilized if a sleep history is not available for the location in the application.

In another embodiment of the present invention, a second request for entry of sleep mode is received. It is determined if the second request for entry of sleep mode is a continuation of the first request for entry of sleep mode and execution of the application is suspended for a second predetermined time period. The first predetermined time may also be updated to reflect a time based upon the first predetermined time period and the second predetermined time period associated with the application and location in the application requesting entry of sleep mode so as to provide a revised first predetermined time period. Furthermore, the second predetermined time period may be determined based on the first predetermined time period.

In particular embodiments where at least one first request and more than one continuation requests associated with the first request are received, then the first predetermined time may be updated by summing the first predetermined time associated with the first request and the second predetermined times associated with the continuation requests to provide a total time. The first predetermined time may then be set to the total time.

In another embodiment of the present invention, where a plurality of first requests for entry of sleep mode associated with the location in the application have been received and where at least one continuation request for entry of sleep mode was associated with a first request for entry of sleep mode immediately prior to a current first request for entry of sleep mode, the first predetermined time may be increased to a sum of the first predetermined time associated with the current first request and the second predetermined times associated with any continuation requests associated with the current first request if the number of previous first requests for entry of sleep mode from the location in the application of the plurality of first requests having a continuation request for entry of sleep mode associated with the first request is above a predefined threshold value. Furthermore, the first predetermined time may be increased by a first incremental amount if the number of previous first requests for entry of sleep mode from the location in the application of the plurality of first requests having a continuation request for entry of sleep mode associated with the first request is below the predefined threshold value. The incremental amount may be adjusted based on the number of previous first requests for entry of sleep mode from the location in the application of the plurality of first requests having a continuation request for entry of sleep mode associated with the first request. Furthermore, the first incremental amount may be determined based on the first predetermined time.

In another embodiment of the present invention, where a plurality of first requests for entry of sleep mode associated with the location in the application have been received and where no continuation requests for entry of sleep mode associated with a first request for entry of sleep mode immediately prior to a current first request for entry of sleep mode were received the first predetermined time may be decreased by a second incremental amount if the number of previous first requests for entry of sleep mode from the location in the application of the plurality of first requests having a continuation request for entry of sleep mode associated with the first request is below a predefined threshold value. The second incremental amount may be adjusted based on the number of previous first requests for entry of sleep mode from the location in the application of the plurality of first requests having a continuation request for entry of sleep mode associated with the first request. Furthermore, the second incremental amount may be determined based on the first predetermined time.

By incrementally increasing and decreasing the duration of sleep based on past requests for sleep mode, the present invention may adjust the sleep duration for the specific location in the application requesting sleep mode. Furthermore, this adjusted sleep duration may be utilized for subsequent requests for sleep mode from the location in the application, thus further refining the duration of sleep associated with the location in the application.

As will further be appreciated by those of skill in the art, the present invention may be embodied as a method, apparatus or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
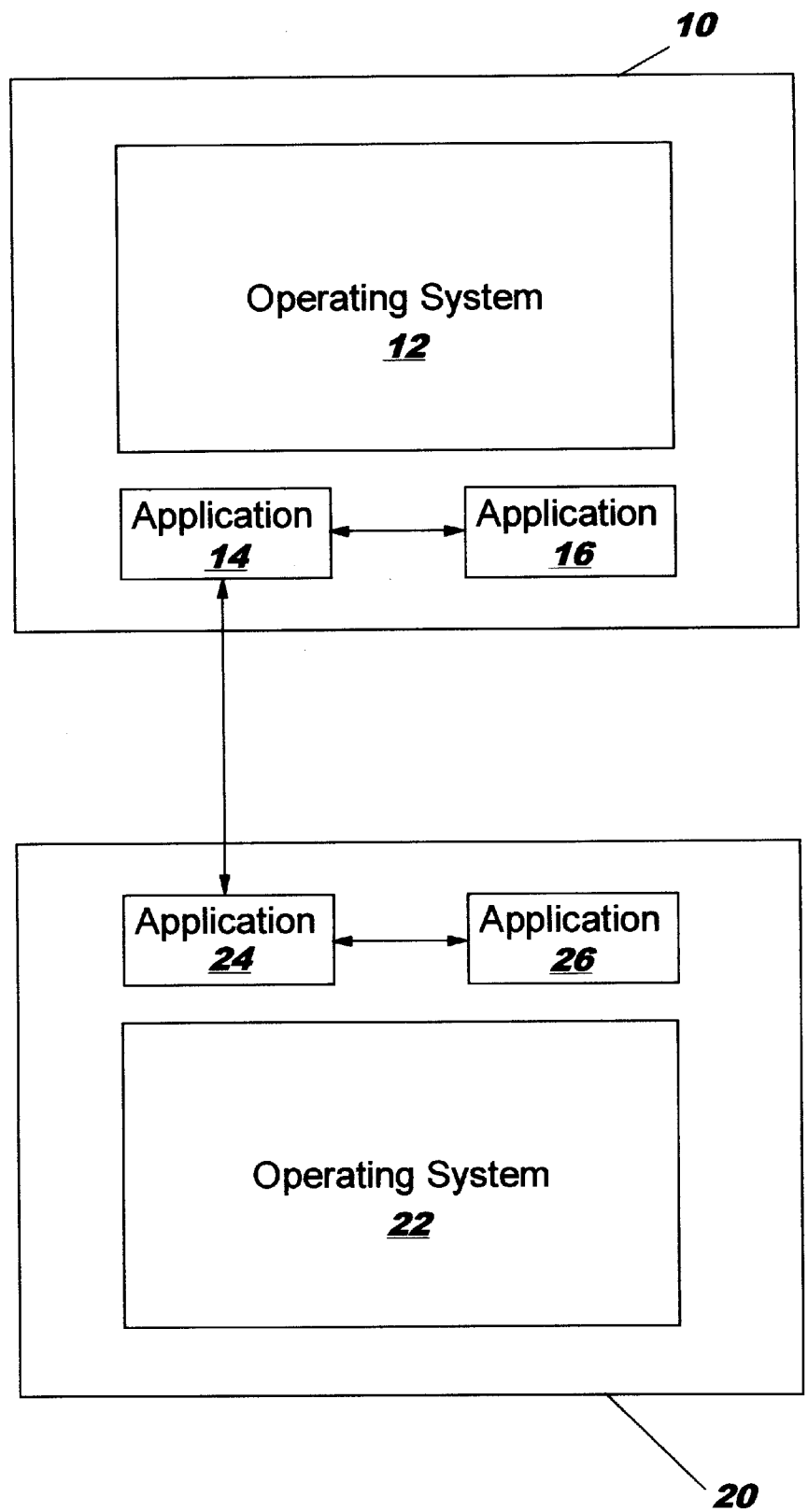
FIG. 1 is block diagram of a processing systems suitable for use with the present invention.

FIG. 1 illustrates data processing systems which may utilize the present invention. As seen in FIG. 1, a data processing system 10 includes an operating system 12 and application programs 14 and 16. Application programs 14 and 16 may communicate with each other or with other application programs executing on other data processing systems such as data processing system 20 illustrated in FIG. 1. Data processing system 20 may also include an operating system 22 and application programs such as application programs 24 and 26.

The present invention provides an enhanced sleep mode. As will be appreciated by those of skill in the art, sleep mode typically suspends execution of an application. Thus, for example, the smart sleep mode of the present invention may be incorporated in data processing system 10 or data processing system 20 for suspension of execution of an application program such as applications 14, 16, 24 or 26. Such a suspension of execution of an application may be utilized, for example, while an application waits for a response to a communication. Thus, if application 14 is communicating with application 16, application 14 may request entry of sleep mode to suspend execution of the application 14 until a response is received from application 16. Similarly, application 14 may request entry of sleep mode if it is communicating with application 24 to suspend execution of application 14 until a response is received from application 24. As will be appreciated by those of skill in the art, the time which application 14 may need to wait for a response from application 16 will typically be different than the time which application 14 may need to wait for a response from application 24. Furthermore, the location in application 14 calling for communication from application 16 may be different from the location in application 14 calling for communication with application 24. The present invention provides for such a difference through the smart sleep mode described herein. While the present invention is illustrated as used with regard to communications between applications, the present invention may be utilized any time suspension of execution of an application is desired.

Figure 2:
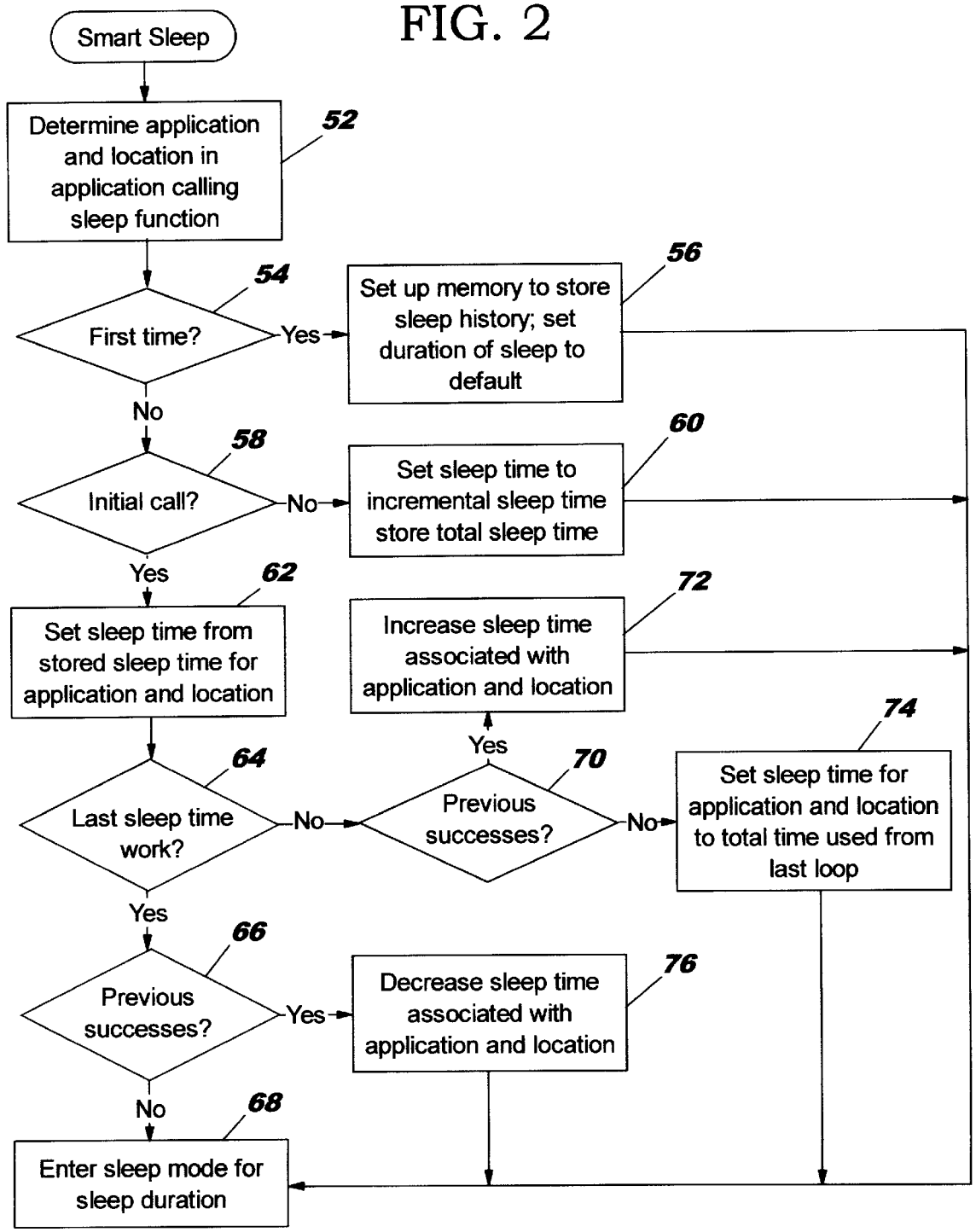
FIG. 2 is a flow chart illustrating operation of the present invention.

As is described with respect to the flow chart illustration of FIG. 2, the present invention provides for a dynamic determination of sleep mode durations so as to control the number of sleep mode requests by an application by reducing the number of sleep mode requests while also reducing the amount of time execution of an application is suspended unnecessarily. The present invention utilizes information about the application and location in the application requesting sleep mode (e.g. the loop in the application) and a history of sleep durations for the location in the application to dynamically establish the sleep mode duration.

The present invention may be implemented as a component of an operating system or as an intermediate routine which intercepts requests for sleep mode to the operating system. Alternatively, the smart sleep mode of the present invention could be incorporated into an application.

The present invention will now be described with respect to FIG. 2 which is a flowchart illustrating the operation of a processing system, for example, as depicted in FIG. 1, utilizing the present invention. It will be understood that each block of the flowchart illustration, and combinations of blocks in the flowchart illustration, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

As is seen in FIG. 2, when smart sleep mode is invoked, the sleep function determines the application and location in the application requesting entry of sleep mode (block 52). This determination may be made by, for example, an application and loop identifier provided to the sleep function by the application requesting entry of sleep mode. Alternatively, the sleep function may determine the application and location in the application from the calling location in memory of the data processing system.

After the application and location in the application requesting sleep mode are determined, it is then determined if this is the first time that sleep mode has been requested for that application and location in the application (block 54). If it is the first time, then memory is set up to create a sleep history for the location in the application and the duration of sleep is set to the default sleep duration (block 56). Sleep mode is then entered and execution of the requesting application is suspended for the sleep duration (block 68).

In setting up the sleep history for the location in the application, a table entry may be created corresponding to the location in the application. The table entry may include information such as the duration required for previous sleep mode requests, whether continuation sleep mode requests were required and the predetermined time to which the sleep duration should be set when a request for entry of sleep mode is received.

Returning to block 54, if the request for entry of sleep mode is not the first request for entry of sleep mode made by the location in the application, then a table entry already exists for that location in the application and so it is determined if this is an initial request for entry of sleep mode or a continuation of a previous request for entry of sleep mode (block 58). According to the present invention, requests for entry of sleep mode may take two forms; initial requests for entry of sleep mode and continuation requests for entry of sleep mode. An initial request for entry of sleep mode is made by an application the first time it requests entry of sleep mode. A continuation request for entry of sleep mode is made by an application when execution of the application was continued after the initial request for entry of sleep mode was completed but the event which was waited for by the application has not occurred (i.e. the duration of the initial sleep mode was not long enough).

If the request is an initial request then the sleep duration is set to the predetermined time in the table entry corresponding to the location in the application (block 62). It is then determined if the previous request for entry of sleep mode associated with the location in the application was successful (i.e. no continuation requests were required) (block 64). If the previous request for entry of sleep mode was successful, then it is determined if a sufficient number of previous initial requests for entry of sleep mode were successful such that the predetermined time associated with initial requests from the location in the application could be reduced (block 66). Such a determination may be made by, for example, establishing a threshold value and then determining if the number of successful previous requests is above or below the threshold value. The threshold value may be a percentage of the total number of previous requests.

If a sufficient number of the previous requests were not successful, then the existing predetermined time is used as the duration of sleep mode and sleep mode is entered by suspension of execution of the application requesting sleep mode (block 68). However, if a sufficient number of the previous requests were successful, then the predetermined time associated with the location in the application requesting sleep mode which specifies the duration of initial sleep mode is decreased (block 66). Sleep mode is then entered using the decreased duration by suspending execution of the application requesting sleep mode for the specified predetermined time (block 68). The decreased sleep time is also set as the predetermined time associated with the location from the application requesting entry of sleep mode.

Returning to block 64, if the previous request for sleep mode from the location in the application was not successful (i.e. a continuation request was required), then it is determined if a sufficient number of previous requests were successful to increase the duration of sleep incrementally, rather than utilizing the total sleep time associated with the previous initial request and any subsequent continuation requests (block 70). Such a determination may be made by, for example, establishing a second threshold value and then determining if the number of successful previous requests is above or below the second threshold value. The second threshold value may be a percentage of the total number of previous requests.

If a sufficient number of the previous requests were not successful (block 70), then the sleep duration for the present request is set to the total time the application was suspended during the previous initial request for entry of sleep mode from the location in the application and the time that the application was suspended during any continuation requests associated with the previous initial request(block 74). Thus, if the previous initial request for entry of sleep mode was not successful and the sleep history for the location in the application indicates that a sufficient number of requests were unsuccessful, then the predetermined time is set to the total sleep time associated with the previous initial sleep mode request and all of its associated continuation requests. The total sleep time is also set as the predetermined time associated with the location from the application requesting entry of sleep mode.

If a sufficient number of the previous requests were successful (block 70), then the sleep duration for the present request is increased from the previous sleep duration by an incremental amount (block 72). Sleep mode is then entered using the increased duration by suspending execution of the application requesting sleep mode for the specified predetermined time (block 68). The increased sleep time is also set as the predetermined time associated with the location from the application requesting entry of sleep mode.

According to the present invention, the incremental increase or decrease of the sleep duration may be made utilizing the same incremental values or different incremental values. Thus, for example, the amount of increase and decrease may be the same amount of time or they may be different. Preferably the incremental times are less than the default time so that a finer resolution of adjustment may be made of the sleep duration. Furthermore, the value of the incremental increase or decrease may be adjusted based on the number of successes reflected in the sleep history. Thus, for example, if a large number of successes were achieved, the incremental value could be decreased to further fine tune the sleep duration associated with the location in the application.

Typical default durations according to the present invention may be about 100 milliseconds, however, as will be appreciated by those of skill in the art, any number of durations may be utilized while still benefitting from the teachings of the present invention. Furthermore, the default duration may be specified by the application requesting the entry of sleep mode such that, if no history is associated with the location requesting entry of sleep mode, the default is utilized. Thus, the present invention may provide for application specific variations in the default duration.

With respect to the incremental values and the time associated with a continuation sleep request, these values may be about 10 or 25 milliseconds, however, any suitable incremental value or continuation value may be utilized. Furthermore, the incremental values as well as the predetermined time associated with a continuation may be established based on the default time periods. For example, 10% of the initial time may be used as the incremental value. Thus, the present invention may adjust the incremental values based on the default values to provide application specific refinement of the sleep duration.

With regard to the determinations of previous successes or failures, the threshold value associated with decreasing the sleep mode duration may be set to about 75%. However, threshold values of from about 50% to about 100% or other threshold values may be utilized as well as other forms of measuring success. With respect to the threshold value for determining if the duration should be set to the total time or incrementally increased, threshold values of about 75% may be suitable. However, threshold values of from about 50% to about 100% may also be used as well as other percentages or forms of success measurement. Furthermore, these threshold values may be rolling averages such that only a subset of all requests are used in determining the threshold comparison. Thus, for example, only the immediately previous 10 requests could be utilized in the threshold comparison so as to filter out anomalous conditions or changes in operating environment.

The present invention has been primarily described above with respect to an embodiment in which information about the application, location and type of request is provided to the sleep function as part of the request. However, as will be appreciated by those of skill in the art, the present invention may alternatively determine such information without the information being provided by the requesting application. For example, the application and location may be determined from the requesting memory location. Furthermore, whether the request is an initial request or a continuation may be determined by the time between requests, for example, a short duration between requests would indicate a continuation request and a longer duration would indicate an initial request. Thus, the present invention may take the form of a replacement routine for a conventional sleep function of the operating system such that requesting applications need not be modified to take advantage of the present invention. Alternatively, the present invention may work cooperatively with requesting applications as described above.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of controlling execution of an application executing on a data processing system, the method comprising the steps of:

receiving a first request for entry of sleep mode; then determining a location in an application requesting entry of sleep mode in response to the first request for entry of sleep mode;

determining a duration of a first predetermined time period based on the application requesting sleep mode and the determined location in the application requesting entry of sleep mode; and suspending execution of the application for the determined duration of the first predetermined time period.

2. A method according to claim 1, wherein the first request for entry of sleep mode specifies the application and location in the application requesting entry of sleep mode and wherein said step of determining the location in the application requesting entry of sleep mode comprises the step of inspecting the first request for entry of sleep mode to determine the application and location in the application requesting entry of sleep mode.

3. A method according to claim 1, further comprising the steps of:

receiving a second request for entry of sleep mode;

determining if the second request for entry of sleep mode is a continuation of the first request for entry of sleep mode; and suspending execution of the application for a second predetermined time period.

4. A method of controlling execution of an application executing on a data processing system, the method comprising the steps of:

receiving a first request for entry of sleep mode;

determining a location in an application requesting entry of sleep mode;

suspending execution of the application for a first predetermined time period based upon the application and location in the application requesting entry of sleep mode;

generating a sleep history associated with the location in the application based on previous durations of sleep associated with the location in the application; and adjusting the first predetermined time based upon the sleep history associated with the location in the application so as to control the number of requests for entry of sleep mode associated with the location in the application.

5. A method according to claim 4 wherein the first request for entry of sleep mode further specifies a first predetermined time period if a sleep history is not available for the location in the application.

6. A method of controlling execution of an application executing on a data processing system, the method comprising the steps of:

receiving a first request for entry of sleep mode;

determining a location in an application requesting entry of sleep mode;

suspending execution of the application for a first predetermined time period based upon the application and location in the application requesting entry of sleep mode;

receiving a second request for entry of sleep mode;

determining if the second request for entry of sleep mode is a continuation of the first request for entry of sleep mode;

suspending execution of the application for a second predetermined time period; and updating the first predetermined time to reflect a time based upon the first predetermined time period and the second predetermined time period so as to provide a revised first predetermined time period for the application and location in the application requesting entry of sleep mode.

7. A method according to claim 6 the second request is a continuation request and at least one additional continuation request associated with the first request and having an additional second predetermined time is received, and wherein the step of updating the first predetermined time comprises the steps of:

summing the first predetermined time associated with the first request and the second predetermined time and additional second predetermined times associated with the continuation requests to provide a total time; and setting the first predetermined time to the total time.

8. A method of controlling execution of an application executing on a data processing system, the method comprising the steps of:

receiving a first request for entry of sleep mode;

determining a location in an application requesting entry of sleep mode;

suspending execution of the application for a first predetermined time period based upon the application and location in the application requesting entry of sleep mode;

receiving a second request for entry of sleep mode;

determining if the second request for entry of sleep mode is a continuation of the first request for entry of sleep mode; and suspending execution of the application for a second predetermined time period wherein the second predetermined time period is determined based on the first predetermined time period.

9. A method of controlling execution of an application executing on a data processing system, the method comprising the steps of:

receiving a first request for entry of sleep mode;

determining a location in an application requesting entry of sleep mode;

suspending execution of the application for a first predetermined time period based upon the application and location in the application requesting entry of sleep mode;

receiving a second request for entry of sleep mode;

determining if the second request for entry of sleep mode is a continuation of the first request for entry of sleep mode; and suspending execution of the application for a second predetermined time period; and wherein the request for entry of sleep mode specifies whether the request is a request for continuation of sleep mode and wherein said step of determining if the request for entry of sleep mode is a continuation of a previous sleep mode request comprises the step of inspecting the sleep mode request to determine if the request is a request for continuation of sleep mode.

10. A method of controlling execution of an application executing on a data processing system, the method comprising the steps of:

receiving a first request for entry of sleep mode;

determining a location in an application requesting entry of sleep mode;

suspending execution of the application for a first predetermined time period based upon the application and location in the application requesting entry of sleep mode;

receiving a second request for entry of sleep mode;

determining if the second request for entry of sleep mode is a continuation of the first request for entry of sleep mode; and suspending execution of the application for a second predetermined time period;

wherein a plurality of first requests for entry of sleep mode associated with the location in the application have been received and wherein at least one continuation request for entry of sleep mode was associated with a first request for entry of sleep mode immediately prior to a current first request for entry of sleep mode, the method further comprising the steps of:

increasing the first predetermined time to a sum of the first predetermined time associated with the current first request and the second predetermined times associated with any continuation requests associated with the current first request if the number of previous first requests for entry of sleep mode from the location in the application of the plurality of first requests having a continuation request for entry of sleep mode associated with the first request is above a predefined threshold value; and increasing the first predetermined time by a first incremental amount if the number of previous first requests for entry of sleep mode from the location in the application of the plurality of first requests having a continuation request for entry of sleep mode associated with the first request is below the predefined threshold value.

11. A method according to claim 10 further comprising the step of adjusting the first incremental amount based on the number of previous first requests for entry of sleep mode from the location in the application of the plurality of first requests having a continuation request for entry of sleep mode associated with the first request.

12. A method according to claim 10, wherein the first incremental amount is determined based on the first predetermined time.

13. A method of controlling execution of an application executing on a data processing system, the method comprising the steps of:

receiving a first request for entry of sleep mode;

determining a location in an application requesting entry of sleep mode;

suspending execution of the application for a first predetermined time period based upon the application and location in the application requesting entry of sleep mode;

receiving a second request for entry of sleep mode;

determining if the second request for entry of sleep mode is a continuation of the first request for entry of sleep mode; and suspending execution of the application for a second predetermined time period;

wherein a plurality of first requests for entry of sleep mode associated with the location in the application have been received and wherein no continuation requests for entry of sleep mode associated with a first request for entry of sleep mode immediately prior to a current first request for entry of sleep mode were received, the method further comprising the step of:

decreasing the first predetermined time by a second incremental amount if the number of previous first requests for entry of sleep mode from the location in the application of the plurality of first requests having a continuation request for entry of sleep mode associated with the first request is below a predefined threshold value.

14. A method according to claim 13, further comprising the step of adjusting the second incremental amount based on the number of previous first requests for entry of sleep mode from the location in the application of the plurality of first requests having a continuation request for entry of sleep mode associated with the first request.

15. A method according to claim 13, wherein the second incremental amount is determined based on the first predetermined time.

16. A system for controlling execution of an application executing on a data processing system, comprising:

means for receiving a first request for entry of sleep mode;

means for determining a location in an application requesting entry of sleep mode responsive to the means for receiving a first request for entry of sleep mode;

means for determining a duration of a first predetermined time period based on the application requesting sleep mode and the determined location in the application requesting entry of sleep mode; and means for suspending execution of the application for the first predetermined time period.

17. A system according to claim 16, wherein the first request for entry of sleep mode specifies the application and location in the application requesting entry of sleep mode and wherein said means for determining the location in the application requesting entry of sleep mode comprises means for inspecting the first request for entry of sleep mode to determine the application and location in the application requesting entry of sleep mode.

18. A system according to claim 16, further comprising:

means for receiving a second request for entry of sleep mode;

means for determining if the second request for entry of sleep mode is a continuation of the first request for entry of sleep mode; and means for suspending execution of the application for a second predetermined time period.

19. A system for controlling execution of an application executing on a data processing system, comprising:

means for receiving a first request for entry of sleep mode;

means for determining a location in an application requesting entry of sleep mode;

means for suspending execution of the application for a first predetermined time period based upon the application and location in the application requesting entry of sleep mode;

means for generating a sleep history associated with the location in the application based on previous durations of sleep associated with the location in the application; and means for adjusting the first predetermined time based upon the sleep history associated with the location in the application so as to control the number of requests for entry of sleep mode associated with the location in the application.

20. A system according to claim 19, wherein the first request for entry of sleep mode further specifies a first predetermined time period if a sleep history is not available for the location in the application.

21. A computer program product for controlling execution of an application executing on a data processing system, comprising:

a computer readable storage medium having computer-readable program code means embodied in said medium, said computer-readable program code means comprising:

computer-readable program code means for receiving a first request for entry of sleep mode;

computer-readable program code means for determining a location in an application requesting entry of sleep mode responsive to the computer-readable program code means for receiving a first request for entry of sleep mode;

computer-readable program code means for determining a duration of a first predetermined time period based on the application requesting sleep mode and the determined location in the application requesting entry of sleep mode; and computer-readable program code means for suspending execution of the application for the first predetermined time period.

22. A computer program product according to claim 21, wherein the first request for entry of sleep mode specifies the application and location in the application requesting entry of sleep mode and wherein said computer-readable program code means for determining the location in the application requesting entry of sleep mode comprises computer-readable program code means for inspecting the first request for entry of sleep mode to determine the application and location in the application requesting entry of sleep mode.

23. A computer program product according to claim 21, further comprising:

computer-readable program code means for receiving a second request for entry of sleep mode;

computer-readable program code means for determining if the second request for entry of sleep mode is a continuation of the first request for entry of sleep mode; and computer-readable program code means for suspending execution of the application for a second predetermined time period.

24. A computer program product for controlling execution of an application executing on a data processing system, comprising:

a computer readable storage medium having computer-readable program code means embodied in said medium, said computer-readable program code means comprising:

computer-readable program code means for receiving a first request for entry of sleep mode;

computer-readable program code means for determining a location in an application requesting entry of sleep mode;

computer-readable program code means for suspending execution of the application for a first predetermined time period based upon the application and location in the application requesting entry of sleep mode;

computer-readable program code means for generating a sleep history associated with the location in the application based on previous durations of sleep associated with the location in the application; and computer-readable program code means for adjusting the first predetermined time based upon the sleep history associated with the location in the application so as to control the number of requests for entry of sleep mode associated with the location in the application.

25. A computer program product according to claim 24, wherein the first request for entry of sleep mode further specifies a first predetermined time period if a sleep history is not available for the location in the application.

26. A system for controlling execution of an application executing on a data processing system, comprising:

means for receiving a first request for entry of sleep mode;

means for determining a location in an application requesting entry of sleep mode;

means for suspending execution of the application for a first predetermined time period based upon the application and location in the application requesting entry of sleep mode;

means for receiving a second request for entry of sleep mode;

means for determining if the second request for entry of sleep mode is a continuation of the first request for entry of sleep mode;

means for suspending execution of the application for a second predetermined time period; and means for updating the first predetermined time to reflect a time based upon the first predetermined time period and the second predetermined time period so as to provide a revised first predetermined time period for the application and location in the application requesting entry of sleep mode.

27. A system for controlling execution of an application executing on a data processing system, comprising:

means for receiving a first request for entry of sleep mode;

means for determining a location in an application requesting entry of sleep mode;

means for suspending execution of the application for a first predetermined time period based upon the application and location in the application requesting entry of sleep mode;

means for receiving a second request for entry of sleep mode;

means for determining if the second request for entry of sleep mode is a continuation of the first request for entry of sleep mode;

means for suspending execution of the application for a second predetermined time period, wherein the second predetermined time period is determined based on the first predetermined time period.

28. A system according to claim 27 wherein the second request is a continuation request and at least one additional continuation request associated with the first request and having an additional second predetermined time is received, and wherein the means for updating the first predetermined time comprises:

means for summing the first predetermined time associated with the first request and the second predetermined time and additional second predetermined times associated with the continuation requests to provide a total time; and means for setting the first predetermined time to the total time.

29. A system for controlling execution of an application executing on a data processing system, comprising:

means for receiving a first request for entry of sleep mode;

means for determining a location in an application requesting entry of sleep mode;

means for suspending execution of the application for a first predetermined time period based upon the application and location in the application requesting entry of sleep mode;

means for receiving a second request for entry of sleep mode;

means for determining if the second request for entry of sleep mode is a continuation of the first request for entry of sleep mode; and means for suspending execution of the application for a second predetermined time period;

wherein the request for entry of sleep mode specifies whether the request is a request for continuation of sleep mode and wherein said means for determining if the request for entry of sleep mode is a continuation of a previous sleep mode request comprises means for inspecting the sleep mode request to determine if the request is a request for continuation of sleep mode.

30. A system for controlling execution of an application executing on a data processing system, comprising:

means for receiving a first request for entry of sleep mode;

means for determining a location in an application requesting entry of sleep mode;

means for suspending execution of the application for a first predetermined time period based upon the application and location in the application requesting entry of sleep mode;

means for receiving a second request for entry of sleep mode;

means for determining if the second request for entry of sleep mode is a continuation of the first request for entry of sleep mode;

means for suspending execution of the application for a second predetermined time period;

means for increasing the first predetermined time to a sum of the first predetermined time associated with the current first request and the second predetermined times associated with any continuation requests associated with the current first request if a number of previous first requests for entry of sleep mode from the location in the application of the plurality of first requests having a continuation request for entry of sleep mode associated with the first request is above a predefined threshold value; and means for increasing the first predetermined time by a first incremental amount if the number of previous first requests for entry of sleep mode from the location in the application of the plurality of first requests having a continuation request for entry of sleep mode associated with the first request is below the predefined threshold value.

31. A system according to claim 30 further comprising means for adjusting the first incremental amount based on the number of previous first requests for entry of sleep mode from the location in the application of the plurality of first requests having a continuation request for entry of sleep mode associated with the first request.

32. A system according to claim 30, wherein the first incremental amount is determined based on the first predetermined time.

33. A system for controlling execution of an application executing on a data processing system, comprising:
   means for receiving a first request for entry of sleep mode;
   means for determining a location in an application requesting entry of sleep mode;
   means for suspending execution of the application for a first predetermined time period based upon the application and location in the application requesting entry of sleep mode;
   means for receiving a second request for entry of sleep mode;
   means for determining if the second request for entry of sleep mode is a continuation of the first request for entry of sleep mode;
   means for suspending execution of the application for a second predetermined time period; and
   means for decreasing the first predetermined time by a second incremental amount if a number of previous first requests for entry of sleep mode from the location in the application of a plurality of first requests having a continuation request for entry of sleep mode associated with the first request is below a predefined threshold value.

34. A system according to claim 33, further comprising means for adjusting the second incremental amount based on the number of previous first requests for entry of sleep mode from the location in the application of the plurality of first requests having a continuation request for entry of sleep mode associated with the first request.

35. A system according to claim 33, wherein the second incremental amount is determined based on the first predetermined time.

36. A computer program product for controlling execution of an application executing on a data processing system, comprising:
   a computer readable storage medium having computer-readable program code means embodied in said medium, said computer-readable program code means comprising:
      computer-readable program code means for receiving a first request for entry of sleep mode;
      computer-readable program code means for determining a location in an application requesting entry of sleep mode;
      computer-readable program code means for suspending execution of the application for a first predetermined time period based upon the application and location in the application requesting entry of sleep mode;
      computer-readable program code means for receiving a second request for entry of sleep mode;
      computer-readable program code means for determining if the second request for entry of sleep mode is a continuation of the first request for entry of sleep mode;
      computer-readable program code means for suspending execution of the application for a second predetermined time period; and
      computer-readable program code means for updating the first predetermined time to reflect a time based upon the first predetermined time period and the second predetermined time period so as to provide a revised first predetermined time period for the application and location in the application requesting entry of sleep mode.

37. A computer program product for controlling execution of an application executing on a data processing system, comprising:
   a computer readable storage medium having computer-readable program code means embodied in said medium, said computer-readable program code means comprising:
      computer-readable program code means for receiving a first request for entry of sleep mode;
      computer-readable program code means for determining a location in an application requesting entry of sleep mode;
      computer-readable program code means for suspending execution of the application for a first predetermined time period based upon the application and location in the application requesting entry of sleep mode;
      computer-readable program code means for receiving a second request for entry of sleep mode;
      computer-readable program code means for determining if the second request for entry of sleep mode is a continuation of the first request for entry of sleep mode; and
      computer-readable program code means for suspending execution of the application for a second predetermined time period, wherein the second predetermined time period is determined based on the first predetermined time period.

38. A computer program product according to claim 37 wherein the second request is a continuation request and at least one additional continuation request associated with the first request and having an additional second predetermined time is received, and wherein the computer-readable program code means for updating the first predetermined time comprises:
   computer-readable program code means for summing the first predetermined time associated with the first request and the second predetermined time and additional second predetermined times associated with the continuation requests to provide a total time; and
   computer-readable program code means for setting the first predetermined time to the total time.

39. A computer program product for controlling execution of an application executing on a data processing system, comprising:
   a computer readable storage medium having computer-readable program code means embodied in said medium, said computer-readable program code means comprising:
      computer-readable program code means for receiving a first request for entry of sleep mode;
      computer-readable program code means for determining a location in an application requesting entry of sleep mode;
      computer-readable program code means for suspending execution of the application for a first predetermined time period based upon the application and location in the application requesting entry of sleep mode;
      computer-readable program code means for receiving a second request for entry of sleep mode;
      computer-readable program code means for determining if the second request for entry of sleep mode is a continuation of the first request for entry of sleep mode; and computer-readable program code means for suspending execution of the application for a second predetermined time period;
wherein the request for entry of sleep mode specifies whether the request is a request for continuation of sleep mode and wherein said computer-readable program code means for determining if the request for entry of sleep mode is a continuation of a previous sleep mode request comprises computer-readable program code means for inspecting the sleep mode request to determine if the request is a request for continuation of sleep mode.

40. A computer program product for controlling execution of an application executing on a data processing system, comprising:

a computer readable storage medium having computer-readable program code means embodied in said medium, said computer-readable program code means comprising:
computer-readable program code means for receiving a first request for entry of sleep mode;
computer-readable program code means for determining a location in an application requesting entry of sleep mode;
computer-readable program code means for suspending execution of the application for a first predetermined time period based upon the application and location in the application requesting entry of sleep mode;
computer-readable program code means for receiving a second request for entry of sleep mode;
computer-readable program code means for determining if the second request for entry of sleep mode is a continuation of the first request for entry of sleep mode;
computer-readable program code means for suspending execution of the application for a second predetermined time period;
computer-readable program code means for increasing the first predetermined time to a sum of the first predetermined time associated with the current first request and the second predetermined times associated with any continuation requests associated with the current first request if a number of previous first requests for entry of sleep mode from the location in the application of the plurality of first requests having a continuation request for entry of sleep mode associated with the first request is above a predefined threshold value; and
computer-readable program code means for increasing the first predetermined time by a first incremental amount if the number of previous first requests for entry of sleep mode from the location in the application of the plurality of first requests having a continuation request for entry of sleep mode associated with the first request is below the predefined threshold value.

41. A computer program product according to claim 40 further comprising computer-readable program code means for adjusting the first incremental amount based on the number of previous first requests for entry of sleep mode from the location in the application of the plurality of first requests having a continuation request for entry of sleep mode associated with the first request.

42. A computer program product according to claim 40, wherein the first incremental amount is determined based on the first predetermined time.

43. A computer program product for controlling execution of an application executing on a data processing system, comprising:

a computer readable storage medium having computer-readable program code means embodied in said medium, said computer-readable program code means comprising:
computer-readable program code means for receiving a first request for entry of sleep mode;
computer-readable program code means for determining a location in an application requesting entry of sleep mode;
computer-readable program code means for suspending execution of the application for a first predetermined time period based upon the application and location in the application requesting entry of sleep mode;
computer-readable program code means for receiving a second request for entry of sleep mode;
computer-readable program code means for determining if the second request for entry of sleep mode is a continuation of the first request for entry of sleep mode;
computer-readable program code means for suspending execution of the application for a second predetermined time period; and
computer-readable program code means for decreasing the first predetermined time by a second incremental amount if a number of previous first requests for entry of sleep mode from the location in the application of a plurality of first requests having a continuation request for entry of sleep mode associated with the first request is below a predefined threshold value.

44. A computer program product according to claim 43, further comprising computer-readable program code means for adjusting the second incremental amount based on the number of previous first requests for entry of sleep mode from the location in the application of the plurality of first requests having a continuation request for entry of sleep mode associated with the first request.

45. A computer program product according to claim 43, wherein the second incremental amount is determined based on the first predetermined time.

* * * * *